United States Patent [19]

Millington

[11] 4,188,687
[45] Feb. 19, 1980

[54] STOPPER COMPONENTS FOR USE IN FISHING TRAWLS

[75] Inventor: Michael J. Millington, Kidderminster, England

[73] Assignee: Parsons Controls Limited, Stourport-on-Severn, England

[21] Appl. No.: 922,121

[22] Filed: Jul. 5, 1978

[30] Foreign Application Priority Data

Jul. 6, 1977 [GB] United Kingdom ............... 28356/77

[51] Int. Cl.² .......................................... A01K 73/02
[52] U.S. Cl. ........................................ 24/114.5; 43/8
[58] Field of Search ............. 24/114.5, 129 R, 129 B, 24/201 A; 43/8, 9; 59/86, 85

[56] References Cited

U.S. PATENT DOCUMENTS

| 1,601,893 | 10/1926 | Vigneron | 43/9 |
| 2,525,194 | 10/1950 | Anderson et al. | 59/86 |
| 3,959,909 | 6/1976 | Buschini et al. | 59/86 X |
| 3,962,810 | 6/1976 | Buschini et al. | 43/8 |

Primary Examiner—Philip C. Kannan
Attorney, Agent, or Firm—Kemon & Estabrook

[57] ABSTRACT

A stopper component for use in a fishing trawl which is made of metal and which includes first and second closed loops each defining an aperture, said closed loops merging to form a central portion from which outwardly projecting shoulders emerge. The outwardly projecting shoulders preventing the stopper component from being passed through a Kelly's Eye.

5 Claims, 2 Drawing Figures

STOPPER COMPONENTS FOR USE IN FISHING TRAWLS

This invention relates to a stopper component for use with chain and/or wire rope assemblies, especially chain and/or wire rope assemblies for trawling gear.

According to the invention there is provided a stopper component for use in a fishing trawl, the component including a first closed loop defining an aperture at one end of a double link form, a second closed loop defining an aperture at the other end of the double link form, said first and second closed loops merging together, and shoulders respectively projecting outwardly from the sides of the component at the location where the first and second closed loops merge, said shoulders projecting laterally outwardly beyond said first and second closed loops.

Figure 1:
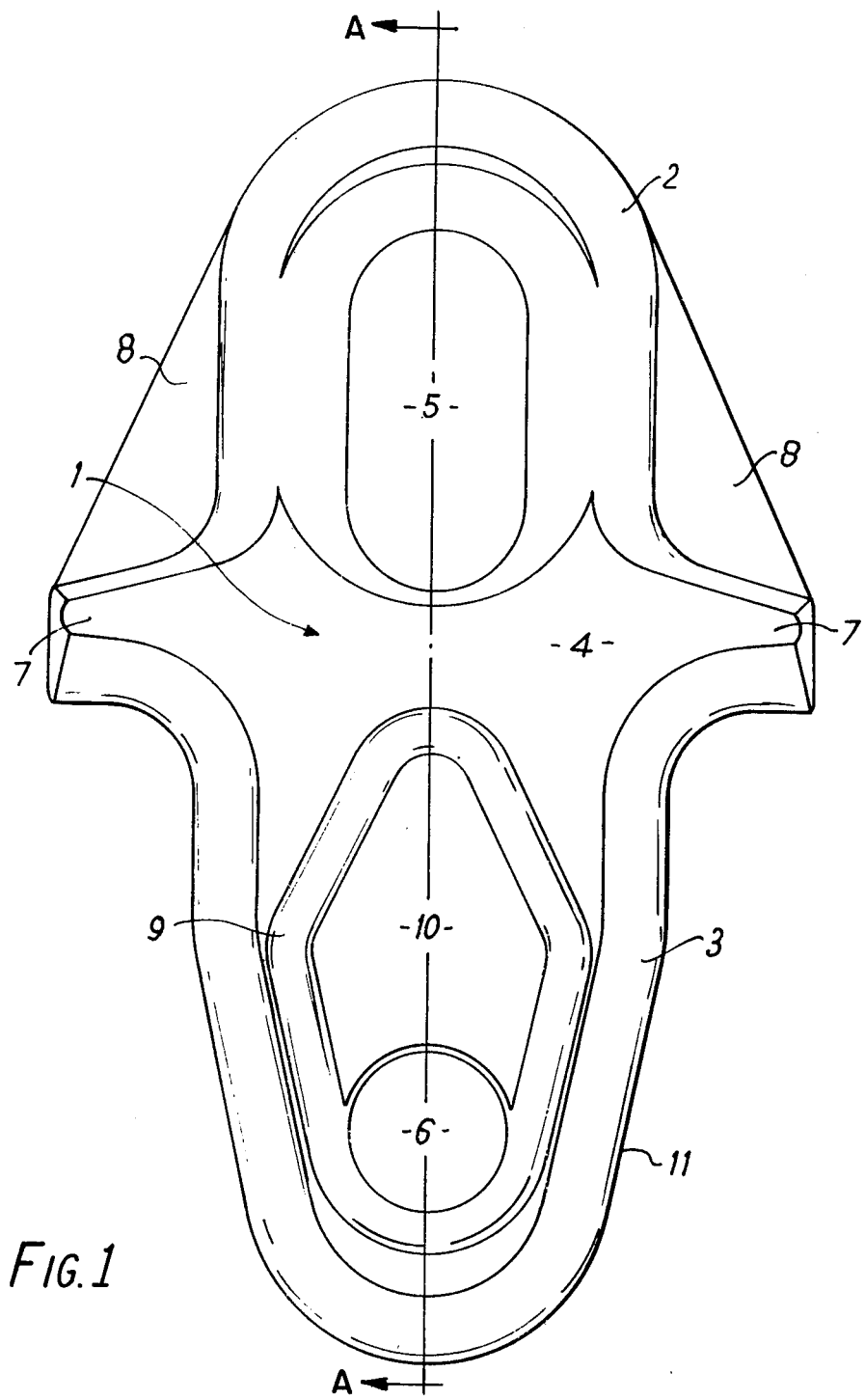
Figure 2:
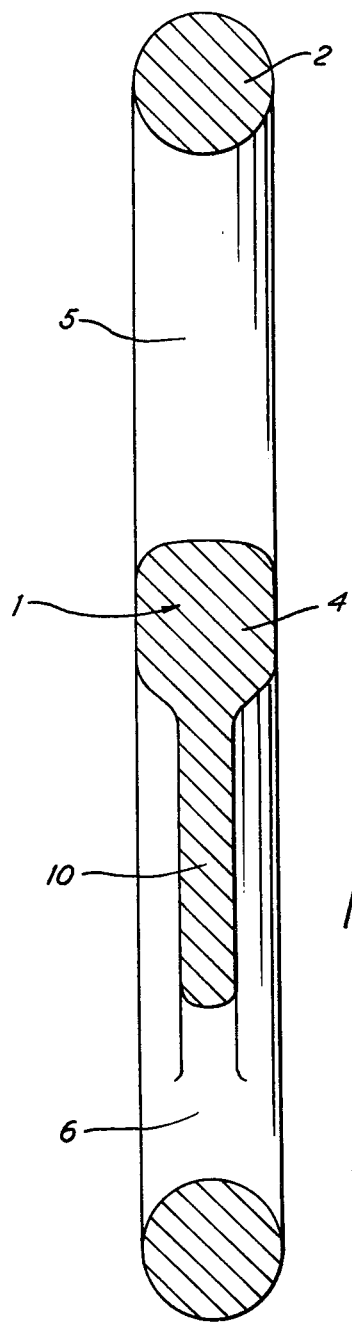

FIG. 1 is a plan view of a stopper component embodying the present invention; and FIG. 2 is a cross sectional view taken on the line A—A of FIG. 1.

The invention will now be described, by way of example, with reference to the drawing which illustrates in plan view a stopper component, including a double link 1 having opposed end portions 2 and 3 each in the form of a closed loop defining an aperture and merging in a central portion 4, the closed loops being aligned in the same plane. The end portion 2 defines an elongated aperture 5 whilst the end portion 3 defines a circular aperture 6. The central portion 4 of the component extends laterally beyond the sides of the end portions 2 and 3 to form a shoulder 7.

The portions 2 and 3 of the component defining the closed loops are of generally circular cross-section although the extreme end sections thereof, against which when the component is in use in a chain and/or wire rope assembly, adjoining components will abut are of generally oval cross-section, being extended in the plane of the component. The central portion 4 is of generally rectangular cross-section.

Web portions 8 of reduced cross-sectional thickness join the sides of the end portion 2 with the adjacent portions of the extended central portion 4. The shoulder 7 formed by the extended portions of the central portion and the end portion 3 are radiused. The end portion 3 is formed with an outer region 11 tapered in width, away from the central portion 4.

The circular aperture 6 is formed in a recessed portion 9 disposed within the end portion 3, by which it is defined, the aperture 6 being bounded by a recessed web portion 10 along the sections thereof nearest the central portion 4 of the component and by part of the end portion 3, which defines the closed loop of full thickness, along the sections thereof remote from the central portion.

The stopper component described above is intended to be used in conjunction with a "Kelly's Eye" component such as is the subject of our U.S. Pat. No. 3,959,909. The stopper component is connected through the circular aperture 6 to a chain or wire rope which passes through a Kelly's Eye component and is capable of free sliding movement relative thereto. Movement of the chain or wire rope through the Kelly's Eye component is thus limited by the shoulder 7 of the stopper component, the extended central portion 4 being too large to pass through the Kelly's Eye component. The stopper component may alternatively be used in conjunction with any other component through which a chain or wire rope, attached through the circular aperture 6 of the stopper component, may freely pass but through which the central portion 4 of the stopper component will not pass.

The stopper component described above may be used in trawling gear, at two positions, for connecting the ends of a length of wire rope to lengths of chain. The length of wire rope passes through a Kelly's Eye component and is capable of sliding movement relative thereto. The length of wire rope and lengths of chain are connected respectively to the circular and elongate apertures 6 and 5 of the stopper components by means of suitably dimensioned shackles. The stopper components thus prevent the wire from being pulled through the Kelly's Eye beyond its connections to the lengths of chain.

The radiusing of the shoulders 7 and tapered outer region 11 of the end portion 3 substantially reduce the risk of the stopper component 1 becoming wedged in the Kelly's Eye component. Also the recessing of the circular aperture 6 permits angular displacements to occur between the chain or wire rope connected to the stopper component and the stopper component. The chain or wire rope can be connected to the stopper component at the aperture 6 by a shackle. When a shackle is used the recessing of the aperture 6 in the region 10. and reduces any tendancy of the shackle to wedge at an angle, in the aperture 6, which, if allowed, would foul the Kelly's Eye component and prevent free movement of the wire rope and shackle therethrough, in addition to imposing a load across the legs of the shackle.

Stopper components according to the present invention are preferably manufactured from nickel chromium molybdenum alloy steel having a Brinnell hardness in the range of 300 to 340.

I claim:

1. A stopper component for use in a fishing trawl of a general double chain link form having opposed end portions each aligned in the same plane wherein the end portions include a first closed loop defining an elongated aperture, and a second tapered closed loop enclosing a recessed portion which in turn defines a circular aperture such that angular displacements between the stopper component and a component connected to the second closed loop can occur, said first and second closed loops merging together at a central portion, said central portion extending laterally beyond said first closed loop to form a radiused shoulder.

2. A stopper component for use in a fishing trawl as claimed in claim 1 wherein said shoulders are radiused and the second closed loop is tapered.

3. A stopper component for use in a fishing trawl as claimed in claim 2 wherein the aperture defined by the second closed loop is recessed such that angular displacements between the component and a component connected to the second closed loop can occur.

4. A stopper component for use in a fishing trawl as claimed in claim 3 wherein the component is constructed from nickel chromium molybdenum alloy steel having a Brinnell hardness of 300 to 340.

5. A stopper component for use in a fishing trawl as claimed in claim 4 in which said first and second closed loops are aligned in the same plane.

* * * * *